United States Patent [19]

Takeuchi et al.

[11] Patent Number: 5,069,323
[45] Date of Patent: Dec. 3, 1991

[54] RELEASE BEARING INCLUDING REPLACEABLE BUSH

[75] Inventors: Hiroshi Takeuchi; Michitomo Masaki, both of Neyagawa, Japan

[73] Assignee: Kabushiki Kaisha Daiken Seisakusho, Osaka, Japan

[21] Appl. No.: 536,662
[22] PCT Filed: Oct. 11, 1989
[86] PCT No.: PCT/JP89/01044
   § 371 Date: May 31, 1990
   § 102(e) Date: May 31, 1990
[87] PCT Pub. No.: WO90/04114
   PCT Pub. Date: Apr. 19, 1990

[30] Foreign Application Priority Data

Oct. 12, 1988 [JP] Japan .................. 63-133594[U]

[51] Int. Cl.5 ............................................. F16D 23/00
[52] U.S. Cl. .................................... 192/110 B; 192/98
[58] Field of Search ........................................... 192/98

[56] References Cited

U.S. PATENT DOCUMENTS

| | | | |
|---|---|---|---|
| 3,631,954 | 1/1972 | Coaley | 192/98 |
| 3,868,006 | 2/1975 | Linn et al. | 192/98 X |
| 3,951,244 | 4/1976 | Neder | 192/98 |
| 4,080,019 | 3/1978 | Flaissier et al. | 192/98 X |
| 4,142,618 | 3/1979 | Fontaine et al. | 192/98 |
| 4,181,380 | 1/1980 | Vinel et al. | 192/98 X |
| 4,243,130 | 1/1981 | Vinel et al. | 192/98 |
| 4,808,015 | 2/1989 | Babcock | 192/98 |
| 4,815,867 | 3/1989 | Ladin | 192/98 |

FOREIGN PATENT DOCUMENTS

| | | | |
|---|---|---|---|
| 55-48818 | 11/1980 | Japan . | |
| 56-134631 | 10/1981 | Japan . | |
| 63-318322 | 12/1988 | Japan . | |
| 2044385A | 10/1980 | United Kingdom . | |
| 2045380 | 10/1980 | United Kingdom | 192/98 |
| WO89/03489 | 4/1989 | World Int. Prop. O. . | |

Primary Examiner—Allan D. Herrmann
Assistant Examiner—Nicholas Whitelaw
Attorney, Agent, or Firm—Armstrong, Nikaido, Marmelstein, Kubovcik & Murray

[57] ABSTRACT

Disclosed is a release bearing of clutch which comprises a case unit supported on a quill fixed on a housing, a bearing main body incorporated into the case unit, and a sleeve having the case unit slidably supported on the outer circumference of the quill, wherein a bush made of a softer material than the sleeve is interdisposed between the inside of the sleeve and the outside of the quill being fixed detachably on the sleeve.

2 Claims, 1 Drawing Sheet

RELEASE BEARING INCLUDING REPLACEABLE BUSH

BACKGROUND OF THE INVENTION

1. Field of the Invention

The present invention relates to a release bearing used in a friction clutch of an automobile or the like, and more particularly to a release bearing suited to a so-called pull type clutch, that is, a clutch in a structure to cut off the clutch as the diaphragm spring is pulled by the release bearing.

2. Description of the Prior Art

Generally, a release bearing is composed of a case and a bearing main body. The case is an assembly of a sleeve (a tubular member) and a case, and it is slidably supported in a state of direct contact of the sleeve to the quill fixed on the transmission housing, and the case is driven in the axial direction by the lever mechanism interlocking with the clutch pedal. The bearing main body is held on the case, and is coupled with the diaphragm spring of the clutch.

In the pull type clutch, in order to pull the diaphragm spring by the bearing main body in the clutch cut-off action as stated above, the bearing main body is fixed to the diaphragm spring. Accordingly, in a general clutch, for servicing of the clutch, when dismounting the transmission housing from the clutch housing, the quill fixed to the transmission housing is drawn out of the release bearing. At the time of drawing out, the input shaft end portion of the transmission positioned inside the quill also passes through the inside of the release bearing.

Incidentally, in this drawing process, the input shaft may be deviated or inclined in the radial direction with respect to the center line of the release bearing. In the portion projecting from the quill of the input shaft, there is a spline for coupling the clutch disc. As a result, in the drawing process, the spline of the input shaft may collide against the inner surface of the sleeve, that is, the sliding surface finished at high precision, to injure it. If the sleeve is thus injured, it is substantially impossible to replace only the sleeve because of the structure of the release bearing, and it is necessary to replace the entire release bearing. As a result, considerable labor and cost are needed.

Still more, in the conventional structure, since the quill and sleeve are both made of metal, the quill may be worn and must be replaced, which also means labor and cost.

In addition, in the conventional structure, it is necessary to apply grease on the contact surfaces of the quill and sleeve in order to reduce the sliding resistance of the two, and it takes time in assembling work.

The invention is therefore intended to present a structure capable of solving the above problems.

SUMMARY OF THE INVENTION

To achieve the above object, the invention presents a release bearing of clutch which comprises a case unit supported on a quill fixed on a housing, a bearing main body incorporated into the case unit, and a sleeve having the case unit slidably supported on the outer circumference of the quill, wherein a bush made of a softer material than the sleeve is interdisposed between the inside of the sleeve and the outside of the quill being fixed detachably on the sleeve.

According to this structure, in the process of dismounting the transmission housing from the clutch housing, when pulling out the quill and input shaft from the bearing, the bush is fixed on the internal surface of the sleeve. Accordingly, the input shaft collides against only the inside of the bush, and not the inside of the sleeve, and there is no possibility to damage of the sleeve. Of course the bush is damaged and must be replaced, but since the bush is detachably fixed to the inside of the sleeve, it may be replaced easily and inexpensively.

Besides, by using a soft bush, wear of the quill may be prevented, and it is not necessary to apply grease to the quill outer surface.

DESCRIPTION OF THE PREFERRED EMBODIMENTS

Figure 1:
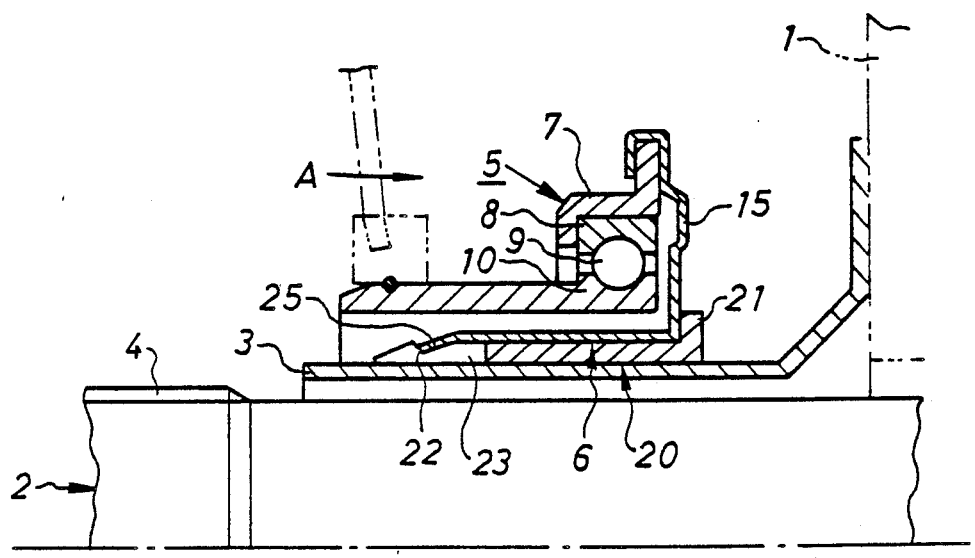
FIG. 1 is a partial sectional schematic drawing of an embodiment of the invention.

In FIG. 1, the input side end portion of an input shaft 2 of a transmission is projecting from a transmission housing 1. Around the projecting portion of the input shaft 2, a quill 3 is concentrically disposed. The quill 3 has the flange portion of its base end fixed to the outer surface of the housing 1. The front end portion of the input shaft 2 is projecting from the quill 3, and a spline 4 is formed in this protruding end portion so as to be coupled with a clutch disc (not shown).

Around the quill 3 there is a release bearing 5. The release bearing 5 is an assembly of a case unit comprising a sleeve 6 and a case 7, and a bearing main body comprising an outer race 8, a ball 9 and an inner race 10. The inner race 10 is projecting to the forward side (the opposite side of the housing 1) from the outer race 8, and its projecting end portion is coupled with an internal end portion of a diaphragm spring 12 by a coupling mechanism 11. Shown in broken lines, the diaphragm spring 12 is intended to thrust the pressure plate, and the pressure plate receives the elastic force of the diaphragm spring 12, and presses the abrasion facing of the clutch disc to the flywheel of the engine, so that the clutch is connected. When cutting off the clutch, the diaphragm spring 12 is pulled by the release bearing 5 to the housing 1 side as indicated by arrow A, so that the elastic force applied on the pressure plate from the diaphragm spring 12 is released. For such pulling action, a lever mechanism (not shown) is coupled to the case 7.

The above structure is similar to the conventional one. The structure of an embodiment of the invention is described in detail below.

The sleeve 6 is supported as the internal circumference of the tubular main body of the sleeve is slidably fitted on the quill 3 as stated below. The sleeve 6 has a large diameter outward flange 15 integrally disposed at the end portion of the housing 1 side, and the flange 15 is fixed to the end portion of the case 7. The case 7 is holding the outer race 8 of the bearing main body on its inner circumference.

According to the invention, a tubular bush 20 is interdisposed between the tubular part of the sleeve 6 and the quill 3. The bush 20 is made of synthetic resin, and therefore it is softer than the metallic quill 3 of sleeve 6. The bush 20 has an outer flange 21 disposed at one end of the tubular main body, and the flange 21 is engaged with the flange 15 from the housing 1 side. The bush 20 has an annular groove 22 near the other end. The outer circumference of the bush 20 is tapered at the leading end from the groove 22.

Figure 2:
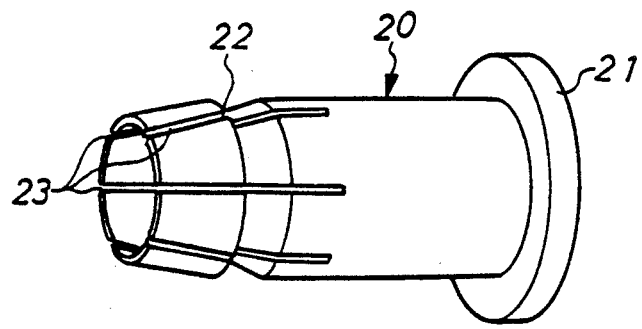
FIG. 2 is a perspective view of the bush in FIG. 1.

As shown in FIG. 2, in the bush 20, plural radial slits 23 are disposed at intervals in the circumferential direction from the leading end of the groove 22 side to the intermediate part in the longitudinal direction of the tubular main body. By these slits 23, the leading end of the bush 20 may be elastically deformed in the diameter decreasing direction.

In FIG. 1, the bush 20 has its entire inner circumference slidably fitted to the outer circumference of the quill 3 in a tight contact state, and the outer circumference is detachably fixed in a tight contact state on the inner circumference of the sleeve 6 in a range from the groove 22 to the flange 21. In order to fix the bush 20 to the sleeve 6, the leading end portion 25 of the sleeve 6 is tapered. This tapered end portion 25 fits into the tapered surface of the groove 22 in a tight contact state, and the bush 20 is prevented from moving in the axial direction of the sleeve 6. Meanwhile, the leading end portion of the bush 20 has slits 23 as stated above, and can be deformed elastically in the radial direction, and when the quill 3 is drawn out of the bush 20, by elastically deforming the end of the bush 20 temporarily inward in the radial direction, the bush 20 can be drawn out of the sleeve 6, and a new bush 20 can be inserted into the sleeve 6.

In servicing and checking of the clutch, the transmission is dislocated from the clutch housing. In this case, the quill 3 remains fixed to the transmission housing 1, and together with removal of the housing 1, the quill 3 is drawn out of the bush 20, and the input shaft 2 is also drawn out from the inside of the bearing 5.

In the drawing work, while the input shaft 1 is deviated or inclined in the radial direction, if passing through the inside of the bearing 5, the spline 4 of the input shaft 2 only touches the interior surface of the bush 20 to damage the bush 20, and it does not contact with the inside of the sleeve 6. Therefore, it is enough to replace the bush 20 until the next assembling work, and it is not necessary to replace the sleeve 6 or replace the entire bearing 5. Of course, the bush 20 can be replaced easily, as mentioned above, by temporarily deforming the bush 20 elastically.

In the working state, since the relatively soft bush 20 slides on the quill 3, the quill 3 will not be worn out.

As described herein, according to the invention, if the input shaft 2 contacts with the inside of the bearing 5 when dissembling the clutch, it is not needed to replace the entire bearing 5, and it is enough to replace only the resin-made bush 20, and the labor and cost of disassembling may be notably reduced.

Besides, wear of the quill 3 may be prevented, and maintenance labor and cost may be saved in this respect, too.

Furthermore, it is not necessary to apply grease on the sliding surface of the quill 3, and hence assembling work may be simplified.

What is claimed is:

1. A clutch release bearing comprising:
    a case unit containing a bearing main body, said case unit including an end flange portion and a tubular sleeve having a leading end opposite said end flange portion for supporting said bearing on a squill of a transmission housing; and
    a bush interdisposed between said sleeve and said squill for slidably supporting said bearing main body thereon, said bush having an outer flange at one end and an annular groove near the other end forming a protrusion for engaging said sleeve leading end;
    said bush having radial slits formed at said other end such that said end may be deformed inwardly to allow insertion of said bush into and removal of said bush from said sleeve.

2. A clutch release bearing as recited in claim 1, wherein said sleeve is formed with a tapered portion at said leading end, and said bush is formed with a tapered portion at said annular groove conforming to said sleeve tapered portion.

* * * * *

UNITED STATES PATENT AND TRADEMARK OFFICE
CERTIFICATE OF CORRECTION

PATENT NO.    : 5,069,323
DATED         : December 3, 1991
INVENTOR(S)   : Hiroshi TAKEUCHI et al It is certified that error appears in the above-identified patent and that said Letters Patent is hereby corrected as shown below:

On the title page, Item [73], "Kabushiki Kaisha Daiken Seisakusho" should read --Kabushiki Kaisha Daikin Seisakusho-.

Signed and Sealed this

Sixteenth Day of March, 1993

Attest:

STEPHEN G. KUNIN

Attesting Officer

Acting Commissioner of Patents and Trademarks